United States Patent
Yamamoto et al.

(10) Patent No.: US 9,933,681 B2
(45) Date of Patent: Apr. 3, 2018

(54) DRIVER FOR ELECTROCHROMIC ELEMENT, METHOD FOR DRIVING ELECTROCHROMIC ELEMENT, OPTICAL FILTER, IMAGING DEVICE, LENS UNIT, AND WINDOW COMPONENT

(71) Applicant: CANON KABUSHIKI KAISHA, Tokyo (JP)

(72) Inventors: Jun Yamamoto, Tokyo (JP); Shinjiro Okada, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 14/296,307

(22) Filed: Jun. 4, 2014

(65) Prior Publication Data
US 2014/0362430 A1    Dec. 11, 2014

(30) Foreign Application Priority Data

Jun. 7, 2013  (JP) ................................. 2013-120805
May 13, 2014  (JP) ................................. 2014-099901

(51) Int. Cl.
*G02F 1/163*    (2006.01)
*G09G 3/19*    (2006.01)
*G02F 1/15*    (2006.01)

(52) U.S. Cl.
CPC ............... *G02F 1/163* (2013.01); *G09G 3/19* (2013.01); *G02F 1/1521* (2013.01)

(58) Field of Classification Search
CPC .......... G02F 1/163; G02F 1/1521; G02F 1/15; G02F 1/1506; G02F 1/1508;
(Continued)

(56) References Cited

U.S. PATENT DOCUMENTS 3,652,149 A * 3/1972 Rogers ..................... C09K 9/02
359/266
3,774,988 A * 11/1973 Rogers ..................... C09K 9/02
359/275
(Continued)

FOREIGN PATENT DOCUMENTS

JP    11-109423 A    4/1999
JP    H11-109463 A    4/1999
(Continued)

OTHER PUBLICATIONS

Machine translation of JPH11109423 (A).*
(Continued)

*Primary Examiner* — Patrick Edouard
*Assistant Examiner* — Joseph Fox
(74) *Attorney, Agent, or Firm* — Canon U.S.A. Inc., IP Division

(57) ABSTRACT

A driver for an electrochromic element is configured to adjust the transmittance of a solution-type electrochromic element to allow the element to display a tone. The element has a pair of electrodes and at least one organic electrochromic material mixed between the electrodes. The driver has an adjusting controller configured to adjust the transmittance of the element. The adjusting controller has controller A and controller B. Controller A is configured to saturate a change in the transmittance of the element to an initial state by applying the voltage which resets the element to the initial state. Controller B is configured to control the tone of the element by applying the voltage which adjusts the transmittance of the element following controller A.

18 Claims, 9 Drawing Sheets

(58) Field of Classification Search
CPC .... G02F 1/1523; G02F 1/1525; G02F 1/1527; G02F 1/153; G02F 1/1533; G02F 1/155; G02F 1/157; G02F 1/161; G02F 2001/1504; G02F 2001/151; G02F 2001/1512; G02F 2001/1515; G02F 2001/1517; G02F 2001/1519; G02F 2001/1536; G02F 2001/1552; G02F 2001/1555; G02F 2001/1557; G02F 2001/1635; G09G 3/19; G09G 3/38

See application file for complete search history.

(56) References Cited

U.S. PATENT DOCUMENTS

| | | | | |
|---|---|---|---|---|
| 4,035,060 | A * | 7/1977 | Tsunoda | G04G 9/06 349/139 |
| 4,092,637 | A * | 5/1978 | Barclay | C25D 11/00 345/204 |
| 4,150,362 | A * | 4/1979 | Uede | G02F 1/163 345/105 |
| 4,166,676 | A * | 9/1979 | Furuta | G02F 1/163 345/105 |
| 4,175,836 | A * | 11/1979 | Redman | G02F 1/163 345/105 |
| 4,181,406 | A * | 1/1980 | Kohara | G02F 1/163 359/265 |
| 4,192,581 | A * | 3/1980 | Yaguchi | C09K 9/02 252/600 |
| 4,526,441 | A * | 7/1985 | Dowden | G02F 1/1506 359/271 |
| 4,764,415 | A * | 8/1988 | Isoda | B82Y 10/00 428/212 |
| 5,604,626 | A * | 2/1997 | Teowee | B32B 17/10036 359/265 |
| 5,973,819 | A * | 10/1999 | Pletcher | G09G 3/38 351/44 |
| 2003/0227663 | A1 * | 12/2003 | Agrawal | B32B 17/10036 359/265 |
| 2004/0032638 | A1 * | 2/2004 | Tonar | C09K 9/02 359/265 |
| 2006/0290651 | A1 * | 12/2006 | Verhaegh | G02F 1/133555 345/107 |
| 2007/0109218 | A1 * | 5/2007 | Saito | G09G 3/38 345/55 |
| 2010/0091352 | A1 * | 4/2010 | Kokeguchi | G02F 1/1506 359/268 |
| 2010/0097684 | A1 * | 4/2010 | Ono | G02F 1/1506 359/270 |
| 2010/0134865 | A1 * | 6/2010 | Higuchi | G02F 1/1521 359/273 |
| 2011/0292487 | A1 * | 12/2011 | Noh | G02F 1/15 359/265 |
| 2012/0062975 | A1 * | 3/2012 | Mehtani | G02F 1/163 359/265 |
| 2013/0100517 | A1 * | 4/2013 | Yamada | C07D 495/14 359/265 |
| 2013/0135505 | A1 * | 5/2013 | Yoshida | H01L 27/14618 348/311 |
| 2013/0258440 | A1 * | 10/2013 | Eaton | G02F 1/163 359/275 |
| 2013/0265629 | A1 * | 10/2013 | Deguchi | G02F 1/155 359/273 |
| 2015/0116808 | A1 * | 4/2015 | Branda | E06B 9/24 359/241 |
| 2016/0011441 | A1 * | 1/2016 | Schwartz | G02F 1/1323 359/275 |

FOREIGN PATENT DOCUMENTS

| | | |
|---|---|---|
| JP | 11-316396 A | 11/1999 |
| JP | 2011-170364 A | 9/2011 |
| WO | 2012/169093 A1 | 12/2012 |

OTHER PUBLICATIONS

Machine translation of JPH11316396 (A).*
Hill, et al., "Oligothiophene Cation Radicals. π—Dimers as Alternatives to Bipolarons in Oxidized Polythiophenes", (1992), Chemistry of Materials, vol. 4, pp. 1106-1113.

* cited by examiner

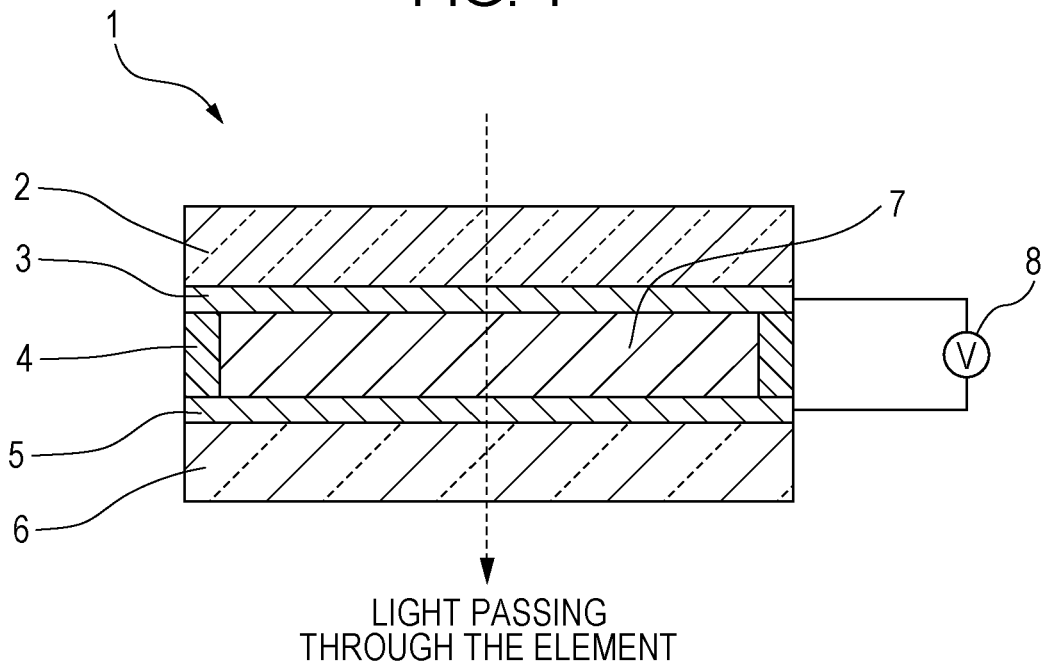
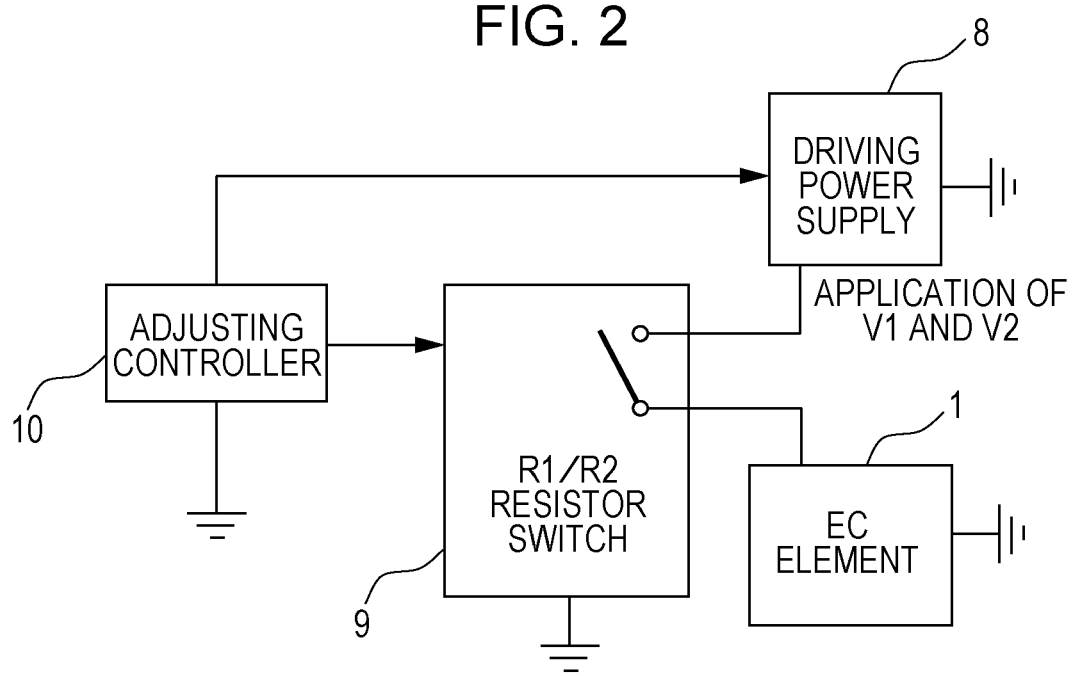

DRIVER FOR ELECTROCHROMIC ELEMENT, METHOD FOR DRIVING ELECTROCHROMIC ELEMENT, OPTICAL FILTER, IMAGING DEVICE, LENS UNIT, AND WINDOW COMPONENT

BACKGROUND OF THE INVENTION

Field of the Invention

The present invention relates to a driver for an electrochromic element, a method for driving an electrochromic element, an optical filter, an imaging device, a lens unit, and a window component. In particular, the present invention relates to a driver for an organic electrochromic element configured to adjust the tone of the element, a method for driving an organic electrochromic element with such a driver, and an optical filter, an imaging device, and a window component in which such a driver is used.

Description of the Related Art

Electrochromism (EC) is a phenomenon in which a reversible electrochemical reaction (oxidation or reduction) induced upon application of voltage changes the optical absorption range of a substance and thereby makes the substance colored or colorless. An electrochemically colored/erased element that works on electrochromism is referred to as an electrochromic (EC) element and is expected to be used as a light-controlling element with varying light transmittance.

Known EC elements include ones in which a metal oxide, such as $WO_3$, is used as EC material, EC elements in which a conductive polymer is used, and EC elements in which an organic small molecule, such as viologen, is used. In particular, an organic EC element in which a low-molecular-weight organic material turns colored/colorless in the form of solution is known to have advantages such as a sufficiently high contrast ratio in the colored state and high transmittance in the colorless state. This type of EC element is also known to be advantageous in that it can have any desired color tone by containing multiple materials with different absorption wavelengths.

The use of an EC element in an optical filter requires tone control drive that allows for the control of the amount of light that passes through the filter. As a driving method for tone control, Japanese Patent Laid-Open No. 11-109423 discloses a PWM driving method that includes applying a voltage pulse. In this driving method the tone is controlled through the control of the durations per pulse for which the oxidation and the reduction of the organic EC material proceed.

Japanese Patent Laid-Open No. 11-316396 discloses a method for preventing EC material in an EC element from remaining colored at the start of service of the EC element, and this method includes resetting the EC element to the initial state at the start or end of service of the element.

A non-patent document (Michael G. Hill, Jean-Francois Penneau, Baruch Zinger, Kent R. Mann, and Larry L. Miller, "Oligothiophene Cation Radicals. π-Dimers as Alternatives to Bipolarons in Oxidized Polythiophenes," *Chemistry of Materials*, 1992, 4, 1106-1113) reports a material whose radical species forms an assembly while the material is colored through oxidation.

The control of the tone of an organic EC element through quantitative regulation of electrochemical reaction has been found disadvantageous because of the following problems that occur with a single material or between multiple materials.

As disclosed in the aforementioned non-patent document, some materials have a radical species that forms an assembly (a dimer) while the material is colored through reaction. The electronic state of such an assembly is different from that of the radical species of the material, and thus the radical form and the assembly exhibit different absorption profiles. Research by the inventors has found that the absorption spectrum of such a material varies because the behavior of absorption changes of the radical species and the assembly during coloring is different from that during erasing. It is therefore difficult to control the tone while maintaining the absorption spectrum in both directions, i.e., the coloring direction and the erasing direction, when using a material that forms an assembly.

In cases where multiple materials are mixed that turn into cation through oxidation from the neutral state and return to the neutral state through back reduction, the absorption ratios between the materials during coloring are different from those during back reduction because the materials have different oxidation voltages and their oxidized forms have different back reduction voltages. In general, oxidation of a material is more likely to occur with increasing positive difference between the oxidation voltage of the material and the voltage of the electrode that acts on the material, and back reduction is more likely to occur with increasing negative difference between the back reduction voltage of the material and the voltage of the electrode that acts on the material. Trying to oxidize multiple materials together therefore results in the material that has the lowest oxidation voltage going into reaction faster than all other materials, which have higher oxidation voltages. When back-reducing the cations as oxidized forms of multiple materials together, however, the reaction is not advantageous to the same material because the back reduction voltage of this material is lower than that of the other materials.

SUMMARY OF THE INVENTION

As a solution to the problems described above, a driver for an electrochromic element is a driver configured to adjust the transmittance of a solution-type electrochromic element to allow the element to display a desired tone. The element has a pair of electrodes and at least one organic electrochromic material mixed between the electrodes.

The driver has an adjusting controller configured to adjust the transmittance of the element. The adjusting controller has controller A and controller B. Controller A is configured to saturate a change in the transmittance of the element to an initial state by applying the voltage which resets the element to the initial state, and controller B is configured to control the tone of the element by applying the voltage which adjusts the transmittance of the element following controller A.

Further features of the present invention will become apparent from the following description of exemplary embodiments with reference to the attached drawings.

BRIEF DESCRIPTION OF THE DRAWINGS

FIG. 1 is a schematic diagram that illustrates an embodiment of an EC element according to an aspect of the invention.

FIG. 2 is a schematic diagram that illustrates an embodiment of an EC-element driver according to an aspect of the invention.

DESCRIPTION OF THE EMBODIMENTS

Figure 3A:
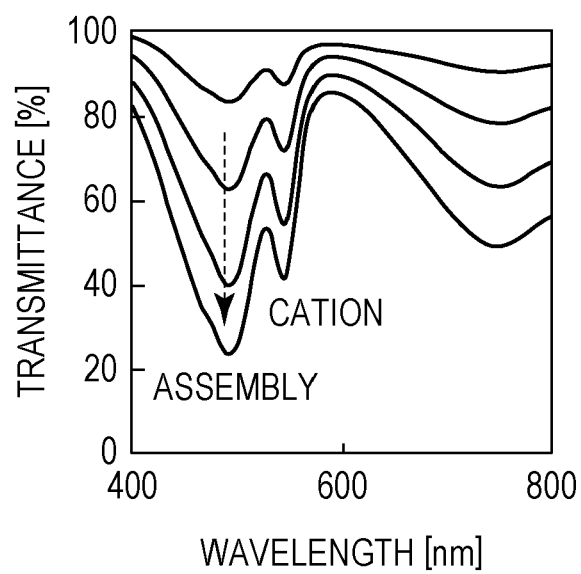
FIGS. 3A and 3B are diagrams that illustrate absorption spectra of a material that forms an assembly.

The following describes some aspects of the invention in detail.

A driver according to an aspect of the invention for an electrochromic (EC) element is a driver configured to adjust the transmittance of a solution-type electrochromic element to allow the element to display a desired tone. The element has a pair of electrodes and at least one organic electrochromic material mixed between the electrodes.

The driver has an adjusting controller configured to adjust the transmittance of the element. The adjusting controller has controller A and controller B. Controller A is configured to saturate a change in the transmittance of the element to an initial state by applying the voltage which resets the element to the initial state, and controller B is configured to control the tone of the element by applying the voltage which adjusts the transmittance of the element following controller A.

The following describes some embodiments of the invention in detail with reference to drawings.

FIG. 1 is a schematic diagram that illustrates an embodiment of an EC element according to an aspect of the invention. As illustrated in FIG. 1, an EC element according to an aspect of the invention has a structure in which a pair of transparent substrates 2 and 6 with a pair of transparent electrodes 3 and 5 are joined together with spacers 4 therebetween in such a manner that the surface of one electrode should face that of the other. This structure also includes an EC layer 7, which is a solution of an electrolyte and the organic EC material in a solvent, located in the space defined by the pair of transparent electrodes 3 and 5 and the spacers 4.

The transparent electrodes 3 and 5 are connected to a drive power supply 8. Applying voltage across the electrodes brings the organic EC material into electrochemical reaction.

Examples of electrochromic elements (also abbreviated to "EC elements") include ones in which the electrochromic material (also abbreviated to "EC material") is an inorganic material and ones in which the EC material is an organic material. An organic electrochromic element (also abbreviated to "organic EC element"), in which the EC material is an organic material, is preferred in particular.

In general, an organic EC material is neutral and does not absorb light in the visible region when no voltage is applied.

An EC element exhibits high transmittance in such a colorless state. Applying voltage across the electrodes induces electrochemical reaction in the organic EC material, making the material in the neutral state oxidized (cation) or reduced (anion). In a cationic or anionic state, an organic EC material absorbs light in the visible region and has a color. An EC element exhibits low transmittance in such a colored state.

Hereinafter, the reaction through which a neutral EC material is oxidized and forms cation is referred to as oxidation, and the voltage at which the oxidation occurs is referred to as oxidation voltage. The reaction through which the cation returns to the neutral state is referred to as back reduction, and the voltage at which the back reduction occurs is referred to as back reduction voltage. Likewise, the reaction through which a neutral EC material is reduced and forms anion is referred to as reduction, and the voltage at which the reduction occurs is referred to as reduction voltage. The reaction through which the anion returns to the neutral state is referred to as back oxidation, and the voltage at which the back oxidation occurs is referred to as back oxidation voltage.

When the EC element is used in a light-controlling element, the EC element may retain high transmittance in the colorless state so that the effects on the optical system can be minimized. The transparent substrates and the transparent electrodes may therefore be made of a material sufficiently permeable to visible light.

The transparent substrates 2 and 6 are typically made of a glass material and can be optical glass substrates made of Corning #7059 or BK-7, for example. Plastic, ceramic, and similar materials can also be used as appropriate if they have sufficient transparency. The transparent substrates are preferably made of a material that is rigid and unlikely to be strained, more preferably with low flexibility. The thickness of the transparent substrates is typically from several tens of micrometers to several millimeters.

The transparent electrodes 3 and 5 can be made of a material that has high optical transparency with respect to light in the visible region along with high conductivity. Examples of such materials include metals and metal oxides such as the indium tin oxide alloy (ITO), tin oxide (NESA), indium zinc oxide (IZO), silver oxide, vanadium oxide, molybdenum oxide, gold, silver, platinum, copper, indium, and chromium, silicon-based materials such as polysilicon and amorphous silicon, and carbon materials such as carbon black, graphite, and glassy carbon. Conductive polymers with improved electrical conductivity resulting from doping or other treatment (e.g., complexes of polyaniline, polypyrrole, polythiophene, polyacetylene, polyparaphenylene, or polyethylenedioxythiophene (PEDOT) and polystyrene sulfonate) can also be used. An EC element according to this embodiment of the invention may have high transmittance in the colorless state, and the electrodes in such an EC element can be made of ITO, IZO, NESA, or a conductive polymer with improved electrical conductivity in particular because these materials do not absorb light in the visible region. Such materials can be used in various forms, such as bulk or fine particles. Such electrode materials can be used alone or in combination.

The EC layer 7 is a solution of an electrolyte and the organic EC material in a solvent.

The solvent can be of any kind in which the electrolyte is soluble and can be a polar one in particular. Specific examples include water and organic polar solvents such as methanol, ethanol, propylene carbonate, ethylene carbonate, dimethylsulfoxide, dimethoxyethane, acetonitrile, γ-butyrolactone, γ-valerolactone, sulfolane, dimethylformamide, dimethoxyethane, tetrahydrofuran, propionitrile, dimethylacetamide, methylpyrrolidinone, and dioxalane.

The electrolyte can be of any kind of ion-dissociative salt that is reasonably soluble and contains a cation or anion electron-donative enough that the organic EC material can be colored. Examples include inorganic ion salts such as alkali metal salts and alkaline-earth metal salts, more specifically, alkali metal salts that contain Li, Na, or K, including $LiClO_4$, $LiSCN$, $LiBF_4$, $LiAsF_6$, $LiCF_3SO_3$, $LiPF_6$, LiI, NaI, NaSCN, $NaClO_4$, $NaBF_4$, $NaAsF_6$, KSCN, and KCl, and quaternary ammonium salts and cyclic quaternary ammonium salts, including $(CH_3)_4NBF_4$, $(C_2H_5)_4NBF_4$, $(n-C_4H_9)_4NBF_4$, $(C_2H_5)_4NBr$, $(C_2H_5)_4NClO_4$, and $(n-C_4H_9)_4NClO_4$. Such electrolyte materials can be used alone or in combination.

The organic EC material can be of any kind that is soluble in the solvent and can express colored and colorless conditions through electrochemical reaction. It is possible to use a known oxidation-/reduction-colorable EC material. When the EC element is used in a light-controlling element, transmittance contrast and wavelength flatness are required. The organic EC material can therefore be a material that exhibits as high transmittance as possible in the colorless state and offers a high coloring efficiency (the ratio of the optical density to the amount of charge injected) for the sake of these requirements. It is also possible to use a combination of multiple materials for wavelength flatness if it is difficult to obtain flat absorption with one material.

Specific examples of organic EC materials that can be used include organic dyes such as quinone dyes, viologen dyes, srylyl dyes, fluoran dyes, cyanine dyes, and aromatic amine dyes and organic metallic complexes such as metalbipyridyl complexes and metal-phthalocyanine complexes.

It is also possible to use a dispersion of an inorganic EC material in a solution. Examples of inorganic EC materials include tungsten oxide, vanadium oxide, molybdenum oxide, iridium oxide, nickel oxide, manganese oxide, and titanium oxide.

The EC layer 7 can be liquid or gel. The EC layer 7 can be used in the form of a solution configured as above and can also be used in the form of gel. Adding a polymer or a gelling agent to solution turns the solution into gel. Examples of such polymers (gelling agents) include, but are not limited to, polyacrylonitrile, carboxymethylcellulose, polyvinyl chloride, polyvinyl bromide, polyethylene oxide, polypropylene oxide, polyurethane, polyacrylate, polymethacrylate, polyamide, polyacrylamide, polyester, polyvinylidene fluoride, and Nafion. In this way, viscous solution or gel, for example, can be used as the EC layer 7.

A transparent structure with a flexible meshwork (e.g., a spongy structure) that carries a solution can also be used as well as a mixture like the above one.

FIG. 2 is a schematic diagram that illustrates an embodiment of an EC-element driver according to an aspect of the invention. A driver according to this embodiment of the invention for an EC element has an EC element 1, a drive power supply 8, a resistor switch 9, and an adjusting controller 10.

The drive power supply 8 applies voltage V1 for resetting the EC element to an initial state and a driving voltage V2 for the display of a desired tone by the EC element. The application of V1 and V2 may be done with separate drive power supplies.

The resistor switch 9 connects one of a resistor R1 and a resistor R2, which is of higher resistivity than the resistor R1, in series in a closed circuit that includes the driving power supply and the EC element, switching between the two resistors. The resistivity of the resistor R1 can be smaller than at least the highest impedance in the closed circuit including the element, preferably 1Ω or less. The resistivity of the resistor R2 can be greater than the highest impedance in the closed circuit including the element, preferably 1 MΩ or more.

The resistor R2 can be regarded as air. In this case the closed circuit is an open circuit, to be exact. However, this open circuit is equivalent to a closed circuit when air is regarded as the resistor R2.

The adjusting controller 10 controls the voltages V1 and V2 at the driving power supply 8 and the switching between the resistors R1 and R2 at the resistor switch 9. A specific example of the structure of the adjusting controller 10 includes controller A and controller B. Controller A is configured to saturate a change in the transmittance of the element to reset the element to an initial state by applying the voltage which resets the element to the initial state, and controller B is configured to control the tone of the element by applying the voltage which adjusts the transmittance of the element following controller A.

The following describes two specific forms of control with the adjusting controller 10, (1) for a case where an organic EC material that forms cation through oxidation is used, and (2) for a case where an organic EC material that forms anion through reduction is used. In the form of control (1), in which oxidation and back reduction are used, how high or low the voltages V1 and V2 are is considered in the same direction as positivity, i.e., voltage is higher with increasing positivity. A voltage higher than the oxidation voltage therefore represents a voltage more positive than the oxidation voltage. In the form of control (2), in which reduction and back oxidation are used, how high or low the voltages V1 and V2 are is considered in the same direction as negativity. A voltage higher than the reduction voltage therefore represents a voltage more negative than the reduction voltage.

In another specific form of control (1) with the adjusting controller 10, controller A applies voltage V1 to saturate a change in the transmittance of the element to reset the element to the initial state, and controller B, following controller A, applies voltage V2 higher than voltage V1 and not lower than the oxidation voltage if voltage V1 is equal to or lower than the back reduction voltage, or applying voltage V2 lower than voltage V1 and not higher than the back reduction voltage if voltage V1 is equal to or higher than the oxidation voltage, connects the resistor R1 in series in the element-containing closed circuit for a duration T1, and connects the resistor R2, which is of higher resistivity than the resistor R1, in series in the element-containing closed circuit for a duration T2 to reduce the circuit current, and controller B continuously alternates connecting the resistor R1 for the duration T1 and connecting the resistor R2 for the duration T2 while in operation.

In another specific form of control (2) with the adjusting controller 10, controller A applies voltage V1 to saturate a change in the transmittance of the element to reset the element to the initial state, and controller B, following controller A, applies voltage V2 higher than voltage V1 and not lower than the reduction voltage if voltage V1 is equal to or lower than the back oxidation voltage, or applying voltage V2 lower than voltage V1 and not higher than the back oxidation voltage if the V1 is equal to or higher than the reduction voltage, connects the resistor R1 in series in the element-containing closed circuit for a duration T1, and connects the resistor R2, which is of higher resistivity than the resistor R1, in series in the element-containing closed circuit for a duration T2 to reduce the circuit current, and controller B continuously alternates connecting the resistor R1 for the duration T1 and connecting the resistor R2 for the duration T2 while in operation.

Controller B is configured to adjust the transmittance of the element by changing T1 with the total duration (T1+T2) constant, where T1 is the duration for which the resistor R1 is in the connected state and T2 is the duration for which the resistor R2 is in the connected state.

The duration (T1+T2) can be 100 milliseconds or less.

The aforementioned EC materials are those that switches between a neutral state and cation upon oxidation and back reduction. It is also possible to use an EC material that switches between a neutral state and anion upon reduction and back oxidation, instead of oxidation and back reduction, respectively.

A method according to an aspect of the invention for driving an electrochromic (EC) element is a method designed to adjust the transmittance of a solution-type electrochromic element to allow the element to display a desired tone. The element has a pair of electrodes and at least one organic electrochromic material mixed between the electrodes.

The method includes adjusting the transmittance of the element (adjustment). The adjustment includes saturating a change in the transmittance of the element to reset the element to the initial state (saturation) and controlling the transmittance (control).

The following describes two specific forms of control in the adjustment, (3) for a case where an organic EC material that forms cation through oxidation is used, and (4) for a case where an organic EC material that forms anion through reduction is used. In the form of control (3), in which oxidation and back reduction are used, how high or low the voltages V1 and V2 are is considered in the same direction as positivity, i.e., voltage is higher with increasing positivity. A voltage higher than the oxidation voltage therefore represents a voltage more positive than the oxidation voltage. In the form of control (4), in which reduction and back oxidation are used, how high or low the voltages V1 and V2 are is considered in the same direction as negativity. A voltage higher than the reduction voltage therefore represents a voltage more negative than the reduction voltage.

In another specific form of control (3) in the adjustment, the saturation includes applying voltage V1 to saturate a change in the transmittance of the element to reset the element to the initial state, and the control, following the saturation, includes
applying voltage V2 higher than voltage V1 and not lower than the oxidation voltage if voltage V1 is equal to or lower than the back reduction voltage, or applying voltage V2 lower than voltage V1 and not higher than the back reduction voltage if voltage V1 is equal to or higher than the oxidation voltage, connecting the resistor R1 in series in the element-containing closed circuit for a duration T1, and connecting the resistor R2, which is of higher resistivity than the resistor R1, in series in the element-containing closed circuit for a duration T2 to reduce the circuit current, wherein connecting the resistor R1 for the duration T1 and connecting the resistor R2 for the duration of T1 continuously alternate while the control proceeds.

In another specific form of control (4) in the adjustment, the saturation includes applying voltage V1 to saturate a change in the transmittance of the element to reset the element to the initial state, and the control, following the saturation, includes applying voltage V2 higher than voltage V1 and not lower than the reduction voltage if voltage V1 is equal to or lower than the back oxidation voltage, or applying voltage V2 lower than voltage V1 and not higher than the back oxidation voltage if the V1 is equal to or higher than the reduction voltage, connecting the resistor R1 in series in the element-containing closed circuit for a duration T1, and connecting the resistor R2, which is of higher resistivity than the resistor R1, in series in the element-containing closed circuit for a duration T2 to reduce the circuit current, wherein connecting the resistor R1 for the duration T1 and connecting the resistor R2 for the duration of T1 continuously alternate while the control proceeds.

The control includes adjusting the transmittance of the element by changing T1 with the total duration (T1+T2) constant, where T1 is the duration for which the resistor R1 is in the connected state and T2 is the duration for which the resistor R2 is in the connected state.

In an embodiment of the invention, at least one of the multiple organic electrochromic materials may have an optical absorption peak different from that of the other organic electrochromic materials.

Furthermore, at least one of the multiple organic electrochromic materials may have an optical absorption peak in the wavelength range from 440 nm to 490 nm or the wavelength range from 540 nm to 630 nm.

Moreover, at least one of the organic electrochromic material may be selected from compounds (1) to (4) represented by the following structural formulae.

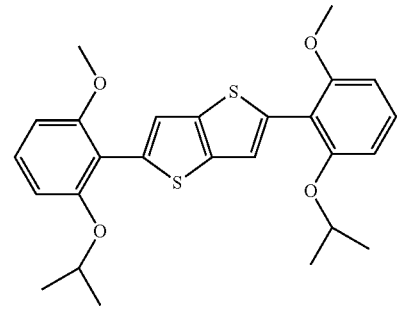

Compound 1

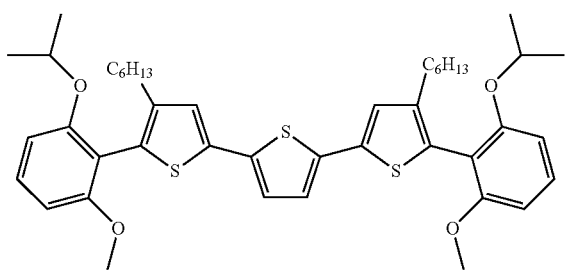

Compound 2

-continued

Compound 3

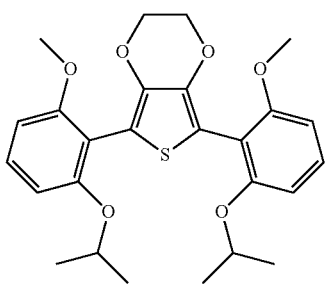

Compound 4

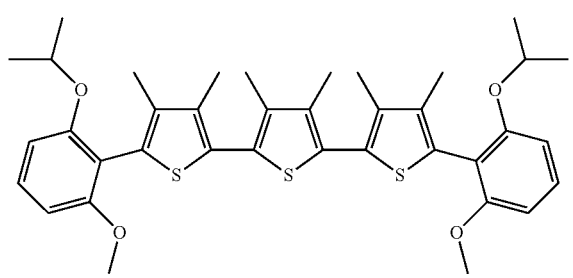

A driver according to an aspect of the invention allows the user to provide an optical filter, an imaging device, a lens unit, and a window component in which a driver for an electrochromic element is used that allows the element to display a desired tone causing no change in the shape of the absorption spectrum.

An optical filter according to an aspect of the invention has the electrochromic element described above and a driver configured to control the electrochromic element.

The optical filter may be used in an imaging device, such as a camera. When used in an imaging device, the optical filter may be provided to the body of the imaging device or a lens unit.

An imaging device according to an aspect of the invention has this optical filter and a light-receiving element configured to receive light after the light passes through the optical filter.

A lens unit according to an aspect of the invention has an optical system including multiple lenses and also has the aforementioned optical filter, and the arrangement is such that light should pass through the optical system after passing through the optical filter.

Another lens unit according to an aspect of the invention has an optical system including multiple lenses and also has the aforementioned optical filter, and the arrangement is such that light should pass through the optical filter after passing through the optical system.

A window component according to an aspect of the invention has the aforementioned driver for an electrochromic element and a circuit configured to supply the driver with driving voltage.

The following describes an embodiment of an imaging device and a lens unit in which an optical filter according to an aspect of the invention is used.

Figure 9:
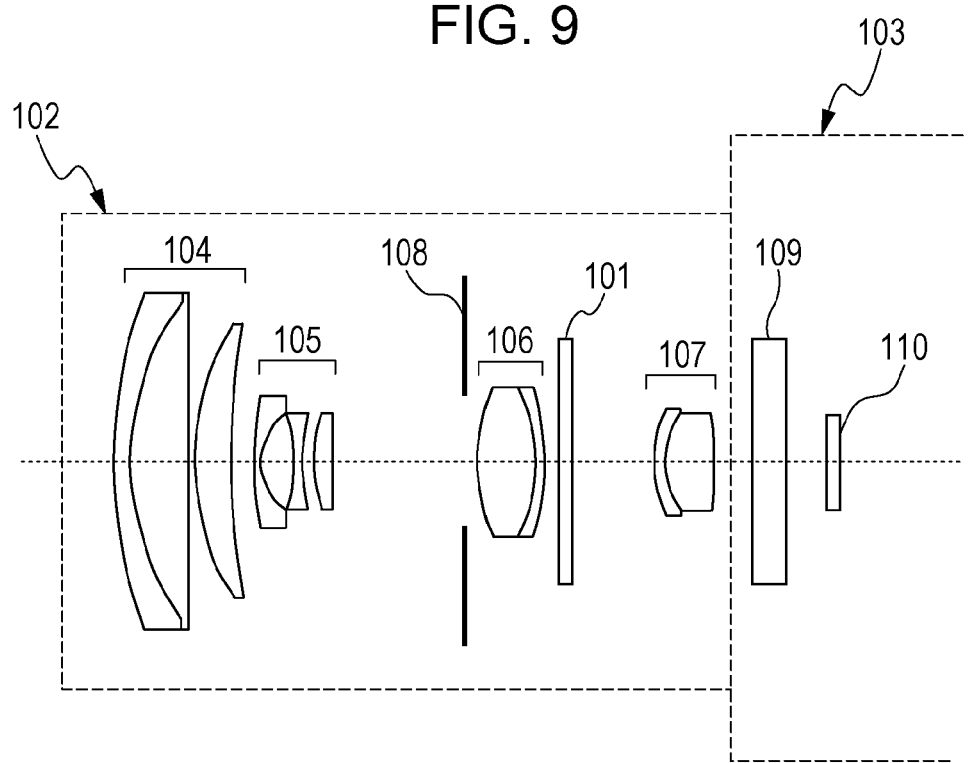
FIG. 9 is a schematic diagram that illustrates a lens unit in which an optical filter according to an aspect of the invention is used and an imaging device that has this lens unit.

FIG. 9 is a schematic diagram that illustrates a lens unit in which an optical filter according to an aspect of the invention is used and an imaging device that has this lens unit.

An optical filter 101 has an organic EC element and an active element connected to the organic EC element and is located in a lens unit 102.

The lens unit 102 is a unit that includes multiple lenses or groups of lenses. For example, the lens unit in FIG. 9 represents a rear-focusing zoom lens, i.e., a zoom lens that focuses behind the diaphragm, and has four groups of lenses, a first lens group 104 with a positive refractive power, a second lens group 105 with a negative refractive power, a third lens group 106 with a positive refractive power, and a fourth lens group 107 with a positive refractive power in this order from the from the objective side. The user changes the distance between the second group and the third group to change the magnification and moves some of the lenses in the fourth group to focus.

The lens unit 102 has, in an illustrative structure, an aperture stop 108 between the second group and the third group and also has an optical filter 101 between the third group and the fourth group.

The arrangement is such that light that passes through the lens unit should pass through the lens groups, the diaphragm, and the optical filter. The amount of light can therefore be adjusted with the aperture stop and the optical filter.

The internal structure of the lens unit can be modified as necessary. For example, the optical filter may be disposed in front of or behind the aperture stop, and it is also possible to place the optical filter in front of (i.e., on the objective side with respect to) the first group or behind the fourth group. Placing the optical filter in the point where light converges is advantageous in that, for example, it allows the optical filter to be smaller in size.

The format of the lens unit can also be selected as appropriate. Besides a rear-focusing lens, the lens unit can be an inner-focusing lens, i.e., a lens that focuses in front of the diaphragm, or any other format of lens. Specialized lenses such as a fisheye lens and a macro lens can also be chosen in addition to a zoom lens, if necessary.

The lens unit is detachably connected to an imaging device 103 through a mount (not illustrated).

A glass block 109 is a glass block that can be a low-pass filter, a phase plate, or a color filter, for example.

A light-receiving element 110 is a sensor that receives light after the light has passed through the lens unit. CCD, CMOS, and other image pickup elements can be used. The light-receiving element 110 can also be a photosensor, such as a photodiode. An element that collects information on the intensity or wavelength of the light and outputs it can be used as appropriate.

When the optical filter is incorporated in the lens unit as in FIG. 9, it is not necessary that a vibration mechanism be bonded to the electrochromic element used as the optical filter. For example, it is possible to use the optical filter with an actuator mechanism with which the lens unit is operated. The movement of the lens groups can be done with the use of an electromagnetic motor or an ultrasonic motor. Transmitting vibration of such a motor to the optical filter has stirring effects on the solution, i.e., the organic EC layer described in Examples, improving the response speed of the element particularly by enhancing the responsiveness to erasing.

Figure 10:
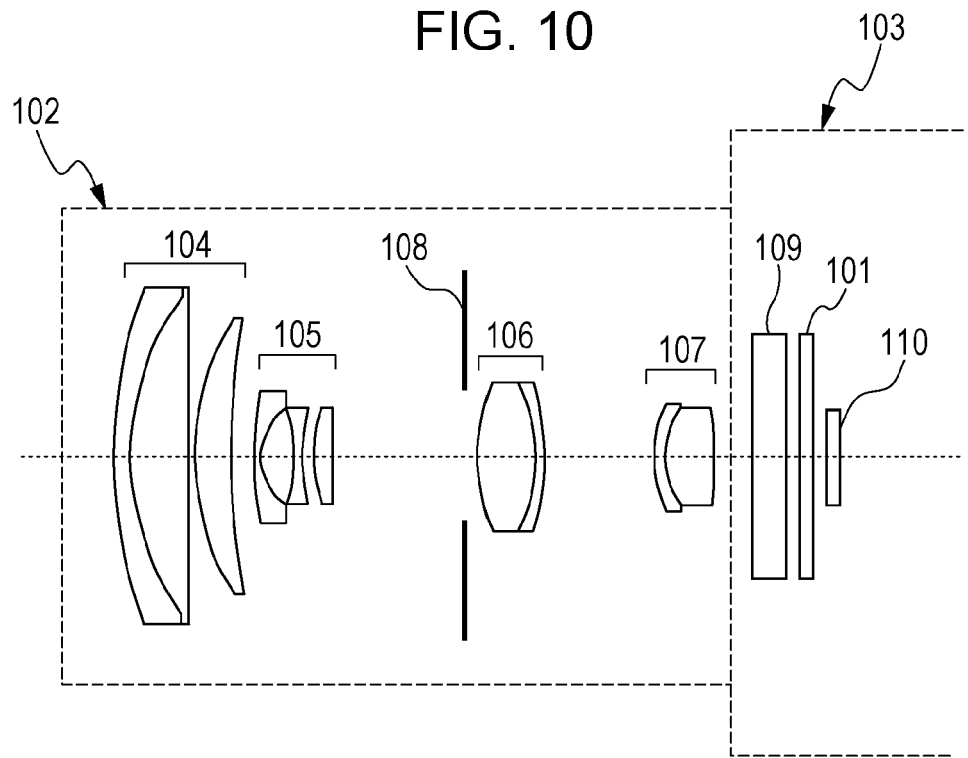
FIG. 10 is a schematic diagram that incorporates an optical filter according to an aspect of the invention.

The imaging device itself may have the optical filter 101. FIG. 10 is a schematic view of an imaging device that has an optical filter.

The optical filter is located in an appropriate position in the imaging device, and a light-receiving element 110 can be located in any position where it receives light after the light has passed through the optical filter. In FIG. 10 the optical filter is located immediately in front of the light-receiving element. Incorporating the optical filter in an imaging device itself provides the imaging device with a light control capability and also allows the imaging device to be used with an existing lens unit because in this case it is not necessary that the attached lens unit itself have the optical filter.

Such an imaging device can be applied to products in which adjustment of the amount of light is combined with a light-receiving element. For example, such an imaging device can be used in cameras, digital cameras, camcorders, and digital camcorders. It is also possible to use such an imaging device to a product that incorporates an imaging device, e.g., a cellular phone, a smartphone, a PC, or a tablet computer.

The use of an optical filter based on an organic EC element as a light controller as in this embodiment allows the user to vary the amount of light control with one filter as appropriate, offering advantages such as the reduction of components in number and size. The use of the optical filter disclosed herein also is also advantageous in that it allows for halftone control and improves responsiveness, for example.

Figure 11A:
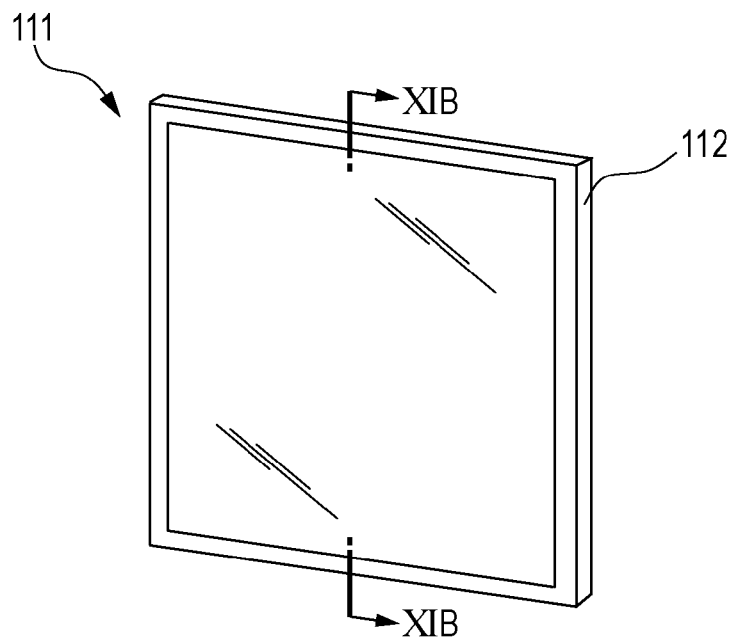
FIGS. 11A and 11B illustrate a window component that has an EC element according to an aspect of the invention.
Figure 11B:
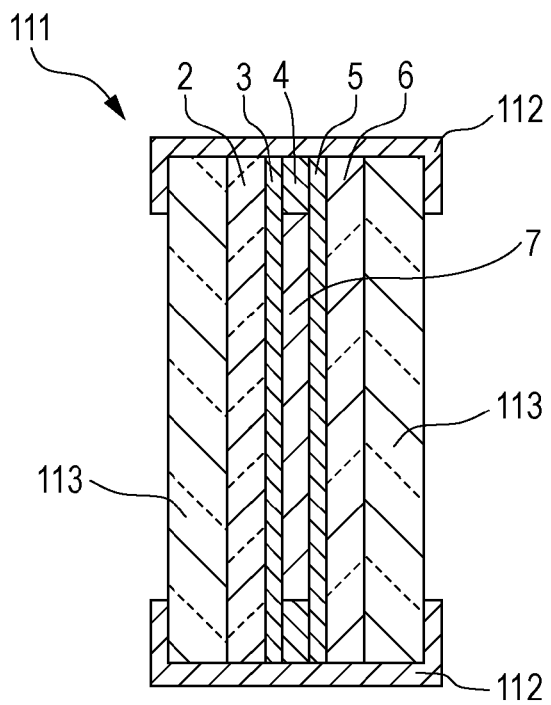

FIGS. 11A and 11B illustrate a window component that has an EC element according to this embodiment. The window component can be used to make windows of houses, automobiles, airplanes, and so forth.

EXAMPLES

The following describes some embodiments of the invention with reference to drawings.

Example 1

This example describes the control of transmittance by taking materials whose neutral species turns into cation developing a color upon oxidation as illustrative organic EC materials, assuming that the initial state of an EC element (the state of the element after resetting) is a substantially colorless state.

Research by the inventors has found that the absorption spectrum of a material that forms an assembly like that described in the aforementioned non-patent document varies because the behavior of absorption changes of the radical species and the assembly during coloring is different from that during erasing. An example of a low-molecular-weight organic EC material that forms an assembly is compound 1.

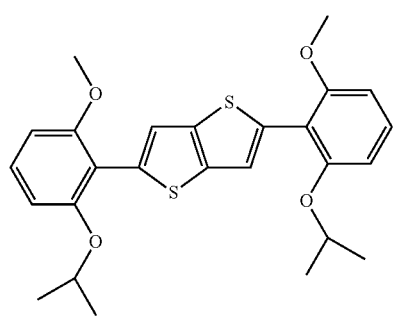

Compound 1

Figure 3B:
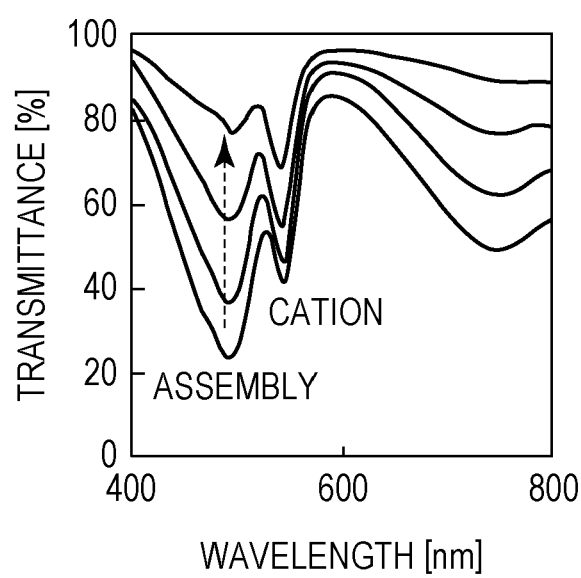

FIGS. 3A and 3B illustrate changes in transmittance on an absorption spectrum of a solution of compound 1 and a supporting electrolyte (TBAP) in solvent propylene carbonate during coloring and erasing, respectively. The concentration of compound 1 is 10 mM, and the concentration of TBAP is 0.1 M. The EC element has a structure in which two glass ITO substrates are joined together with 150-μm spacers therebetween and the space defined by the substrates and the spacers filled with a solution that contains the organic EC material. A voltage of 2 V was applied across the electrodes to color the compound, and 0 V was applied to erase the color of the compound. In FIGS. 3A and 3B a wavelength of 530 nm seems to be an absorption peak corresponding to the cationic species of compound 1, and a wavelength of 496 nm seems to be an absorption peak corresponding to an assembly formed by the cationic species. The changes in the ratio between the two absorption peaks indicate that the absorption by the assembly tends to fall rapidly during erasing, the absorption ratio greatly varying between coloring and erasing. It is therefore difficult to control the tone while maintaining the absorption spectra in both directions, i.e., the coloring direction and the erasing direction, when using a material that forms an assembly.

Mixing multiple organic EC materials to express a given color tone results in the ratios of the amount of optical absorption between the materials during coloring upon application of the oxidation voltage being different from those upon application of the back reduction voltage because the oxidation voltage and the back reduction voltage are different for the specific materials. In general, the tendency of a material toward oxidation and back reduction depends on the state of polarization (overvoltage) with respect to the oxidation voltage and the back reduction voltage as shown in Equation 1. The overvoltage refers to the difference between the oxidation voltage or the back reduction voltage of the material and the voltage applied to the electrodes that acts on the material. In Equation 1, the term i is the current density of the reaction, $i_0$ is exchange current density, $\alpha$ is the charge transfer coefficient, n is the number of electrons involved in the reaction, F is the Faraday constant, $\eta$ is overvoltage, R is the gas constant, and T is temperature. The term $i_0$ has the relationship given in Equation 2. In Equation 2, $k^0$ is the reaction velocity constant, $c_O$ is the concentration of the oxidized form, and $c_R$ is the concentration of the reduced form.

$$i = i_0 \left[ \exp\left(\frac{\alpha n F \eta}{RT}\right) - \exp\left(\frac{-(1-\alpha)nF\eta}{RT}\right) \right] \quad \text{(Equation 1)}$$

$$i_0 \equiv nFk^0 c_O^{(1-\alpha)} c_R^{\alpha} \quad \text{(Equation 2)}$$

In general, upon application of a voltage at which multiple materials are oxidized together, the material with the lowest oxidation voltage of multiple materials is most likely to allow the current to occur that flows during the oxidation between the materials. On the other hand, at a voltage at which multiple materials are reduced back together, the material with the lowest back reduction voltage is most unlikely to allow current to occur during the back reduction between the materials.

Separately, Equation 1 indicates that electrochemical reaction depends on overvoltage if the temperature and the concentrations are constant. This means that the amount of each material involved in the reaction on the surface of the electrode is constant if the overvoltage, i.e., the voltage applied to the EC element, is constant. The total amount of material involved in the reaction is also constant because it depends on the amount of material supplied to the surface of the electrode, i.e., the diffusion constant of the materials.

Consequently, it is possible to color the EC element with uniform absorption ratios between the materials by oxidizing (coloring) the EC element when it is in the initial state.

Figure 4A:
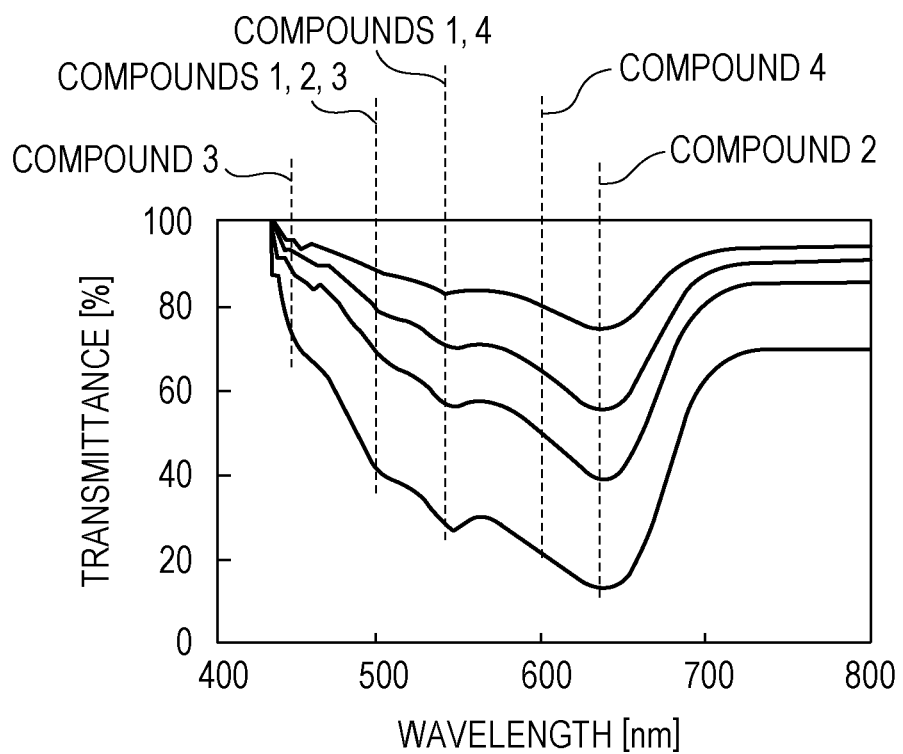
FIGS. 4A and 4B are diagrams that illustrate absorption spectra of an EC element that contains multiple materials, the EC element driven at a fixed voltage.
Figure 4B:
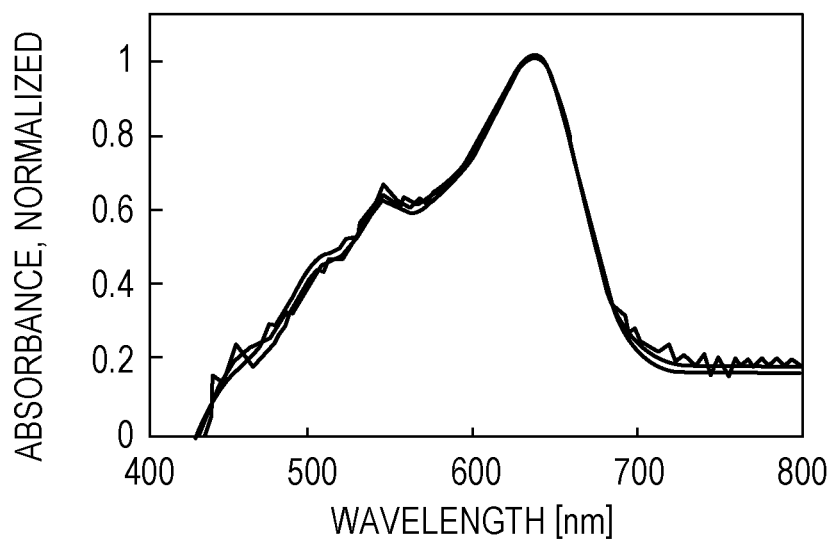

FIGS. 4A and 4B are diagrams that illustrate absorption spectra of an EC element that contains multiple materials, the EC element driven at a fixed voltage. FIG. 4A is a diagram that illustrates changes with time in transmittance on an absorption spectrum upon application of a fixed voltage to four materials, compound 1 and compounds 2, 3, and 4.

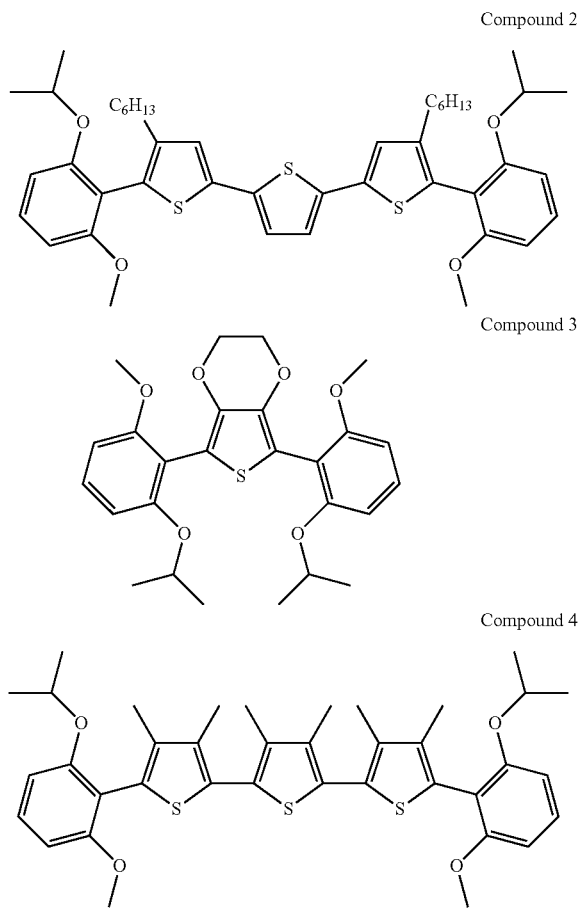

Compound 2

Compound 3

Compound 4

The element structure is the same as that in the measurements illustrated in FIGS. 3A and 3B except that the concentrations of compounds 1, 2, 3, and 4 were 2 mM, 8 mM, 13 mM, and 30 mM, respectively. This diagram illustrates changes in absorption at an applied voltage of 2 V as changes in transmittance with the initial state as reference, indicating that the transmittance decreases with the duration of application corresponding to specific tones. The absorption spectrum in FIG. 4A is a combination of the absorption spectra of the four materials. Compound 1 strongly absorbs light at 496 nm and 530 nm, compound 2 at 500 nm and 630 nm, compound 3 at 440 nm and 490 nm, and compound 4 at 540 nm and 600 nm. The absorption at 440 nm, 490 nm, 540 nm, and 630 nm in FIG. 4A reflects the strong absorption by the individual materials.

FIG. 4B is an overlay of the absorption spectrum for the durations in FIG. 4A obtained through the conversion of transmittance into absorbance and normalization with the absorbance at 630 nm as 1. A relationship—Log(Transmittance)=Absorbance holds between transmittance and absorbance. Lambert-Beer's law indicates that absorbance has the relationship Absorbance=Molar absorptivity×Concentration of the material×Path length of the light. Because of the linearity between the change in absorbance resulting from coloring and the change in the concentration of cation, it is preferred to use absorbance to discuss whether the individual forms of the absorption spectrum agree in shape.

FIG. 4B indicates good agreement in absorbance between the individual forms of the absorption spectrum, demonstrating that an EC element that contained multiple materials was driven successfully, causing no change in the shape of the absorption spectrum, by application of a fixed voltage.

It is therefore possible to drive an EC element, causing no change in the shape of the absorption spectrum, by applying a fixed voltage when driving the EC element in the coloring direction from the initial state.

This means that a driver configured to control the tone of an EC element successfully changes the tone of an EC element when the driver resets the EC element to the initial state and then operates in a mode of drive in which the driver applies a fixed voltage to set the EC element at the next (desired) tone. Such a driver allows an EC element to display a desired tone causing no change in the shape of the absorption spectrum even when the EC element contains multiple materials with different redox potentials.

Figure 5:
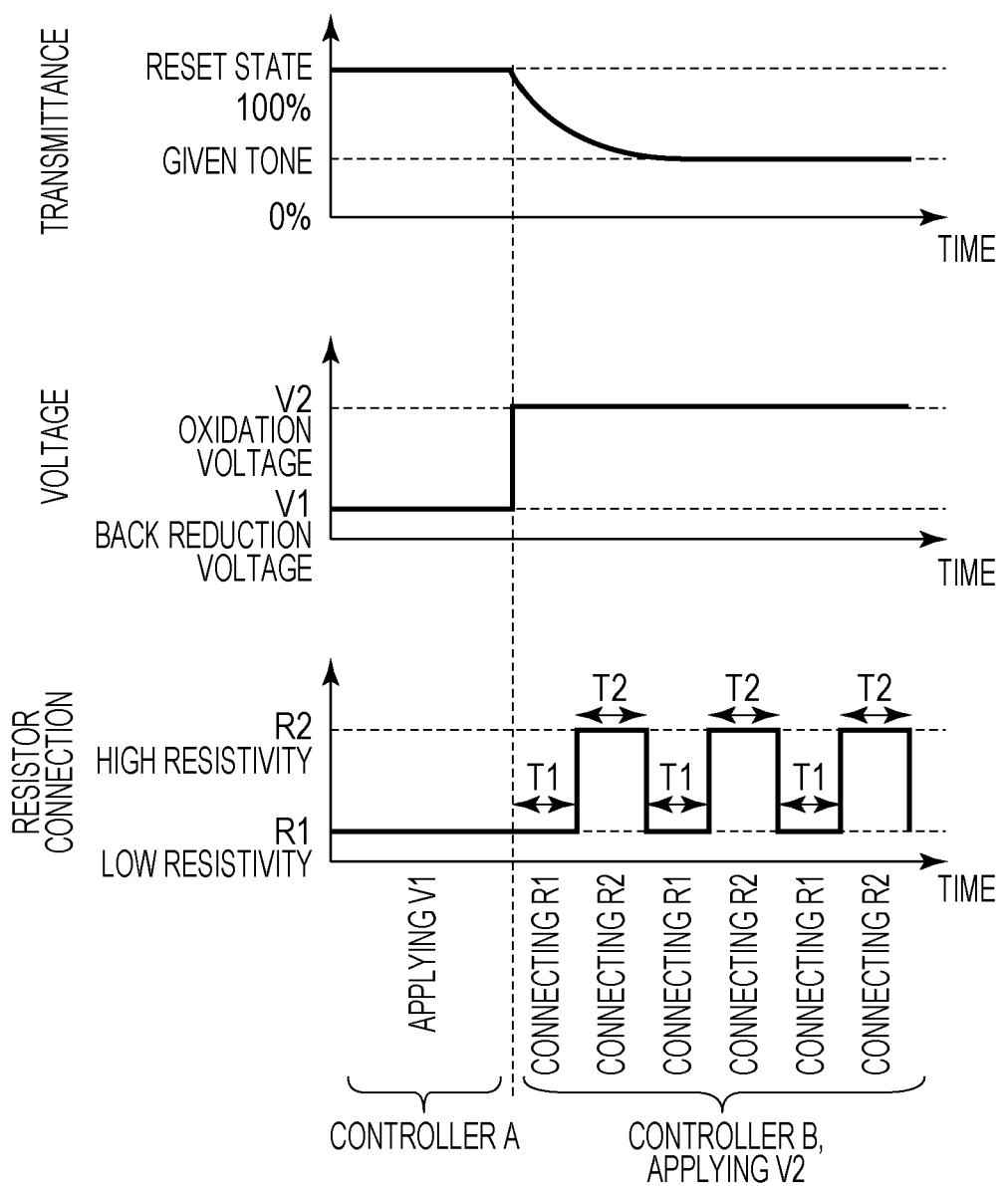
FIG. 5 is a diagram that illustrates a form of drive control used in Example 1 of the invention.

In research by the inventors the use of a form of drive control like that illustrated in FIG. 5 allows a tone condition to be maintained causing no change in the shape of the absorption spectrum.

FIG. 5 illustrates voltages V1 and V2 that are applied to an EC element, resistors R1 and R2 that are connected to a closed circuit that includes the EC element, durations T1 and T2 for which the resistors R1 and R2 are connected, and an associated change in transmittance.

The following describes a case in which an EC element is driven that contains a mixture of compounds 1 to 4 used in FIGS. 4A and 4B. Compounds 1 to 4 are colored upon application of the oxidation voltage and turn colorless upon application of the back reduction voltage. The initial state (reset state) is the colorless state, the back reduction voltage is V1, and the oxidation voltage is V2. What resets the EC element to the initial state is controller A, and what sets it at the next tone following controller A is controller B.

Controller B continuously repeats connecting the resistor R1 to the closed circuit that includes the element for the duration T1 with the oxidation voltage V2 applied and connecting the resistor R2 for the duration T2.

The resistor R1 is of low resistivity, and connecting R1 makes oxidation more likely to occur by allowing current to flow in the closed circuit. The resistor R2 is of high resistivity, and connecting R2 makes oxidation less likely to occur by preventing current from flowing in the closed circuit.

In general, it is known that in an EC element in which a dissolved organic material is used as EC material, the cation resulting from oxidation returns to the neutral state because of self-erasing when left in an open-circuit state (equivalent to a closed circuit when connected with the air, a high-resistivity material).

The change in transmittance is therefore controlled through the control of the ratio of the duration T1 with the total duration (T1+T2) constant, where T1 is the duration for which oxidation proceeds and T2 is the duration for which self-erasing proceeds. Increasing the ratio of the duration T1 increases the change in transmittance, and reducing the ratio of the duration T1 reduces the change in transmittance.

When a tone is changed to the next tone, the shape of the absorption spectrum can be maintained by once resetting the element to the initial state with controller A and then controlling the tone with controller B.

The voltages V1 and V2 are fixed voltages applied by a driving power supply. The connection between the EC element and the driving power supply is controlled with a relay circuit (an analog switch circuit or a transistor circuit) that is a resistor switch. The analog switch circuit switches the connection of the driving power supply with the EC element between the connected state and the disconnected state. The time points of the control with the analog switch circuit were programmed through supply with voltage from an arbitrary waveform generator. The arbitrary waveform generator corresponds to a portion of the functionality of the adjusting controller. The operation of the analog switch circuit is similar to connecting a low-resistivity resistor and a high-resistivity resistor to the wiring of the EC element in series. In this case the low-resistivity resistor can be regarded as the resistivity of the wiring material and is on the order of mΩ, and the high-resistivity resistor is the air and greatly exceeds MΩ.

Switching the circuit including the element between low resistivity and high resistivity in this way controls the amount of current that flows in the circuit. Connecting the circuit to the low-resistivity resistor allows current to flow and oxidation to occur, coloring the EC element. Connecting the circuit to the high-resistivity resistor stops current from flowing and prevents oxidation from occurring, during which the organic EC materials diffuse and self-erase their colors.

Assuming that the initial state (the state after resetting) is a substantially colorless state, continuously switching the connection to the resistors R1 and R2 after the durations T1 and T2 while applying the oxidation voltage (V2) to the element in the initial state using controller B leads to a gradual rise in the overall color and an increase in absorption in the early period of oxidation because in this period the concentration of the neutral species is extremely high in the vicinity of the electrode and thus oxidation is dominant, exceeding the decrease in color associated with self-erasing (hereinafter simply referred to as the self-erasing). Once the increase in color has reached a certain extent, the concentration of the neutral species in the vicinity of the electrode is low and the oxidation has accordingly diminished, whereas the self-erasing is great because the concentration of the cationic species has increased. The balance between the color increase and the self-erasing gradually becomes even in this way. Near the concentration equilibrium point, at which an even balance is reached, the transmittance of the EC element stabilizes and the tone is maintained.

Increasing the ratio of the low-resistivity resistor connection to the total of the durations T1 and T2 (T1+T2), i.e., T1/(T1+T2), which means increasing the duration for which the circuit is connected to the low-resistivity resistor, enhances the color increase and reduces the self-erasing. This shift of the concentration equilibrium point toward greater increase in color leads to the EC element maintaining a greater change in transmittance. In contrast, reducing the duration for which the circuit is connected to the low-resistivity resistor reduces the color increase and enhances the self-erasing. This shift of the concentration equilibrium point toward smaller increase in color leads to the EC element maintaining a smaller change in transmittance.

Figure 6:
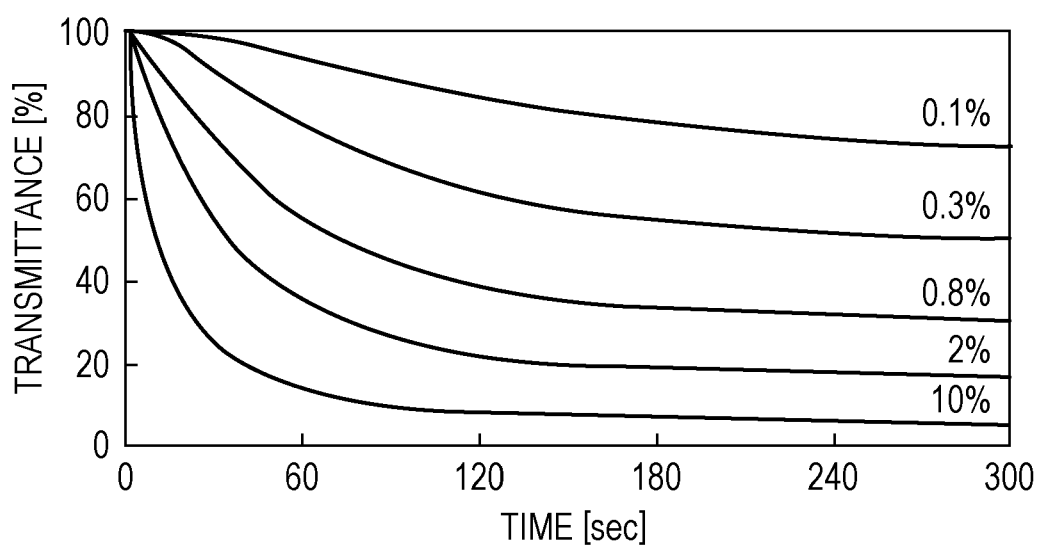
FIG. 6 is a diagram that illustrates the change with time of the 630-nm absorption of an EC element that contains multiple materials in pulse width modulation drive.

FIG. 6 illustrates time courses of a transmittance at a single wavelength of 630 nm during an operation of the EC element used in FIGS. 4A and 4B, which contained a mixture of compounds 1 to 4, according to the form of drive control in FIG. 5.

FIG. 6 is a continuous repeat of the connection to the resistors R1 and R2 conducted while applying an oxidation voltage (V2) of 1.7 V to an element in the initial state (the state after resetting) with the total of the durations T1 and T2 (T1+T2) fixed at 100 Hz (10 msec), illustrating time courses of a transmittance at a single wavelength of 630 nm during a 300-second operation with controller B with the ratio of the low-resistivity resistor connection to the total of the durations T1 and T2 (T1+T2), i.e., T1/(T1+T2), set at 0.1%, 0.3%, 0.8%, 2%, and 10%. As can be seen from FIG. 6, adjusting the ratio of the low-resistivity resistor connection in the form of drive control described in this example successfully controlled and maintained the magnitude of a change in the transmittance of an EC element.

This means that a driver configured to control the tone of an EC element successfully changes the tone of an EC element when the driver resets the EC element to the initial state and then operates in a form of drive control in which the element circuit switches between low resistivity and high resistivity while supplied with a fixed voltage to set the EC element at the next (desired) tone. Such a driver allows an EC element to display a desired tone causing no change in the shape of the absorption spectrum even when the EC element contains a material that forms an assembly or multiple materials with different redox potentials.

Example 2

This example describes the control of transmittance by taking materials whose neutral species turns into cation developing a color upon oxidation as illustrative organic EC materials, assuming that the initial state of an EC element (the state of the element after resetting) is a state in which the transmittance of the EC element is small as a result of coloring.

Figure 7:
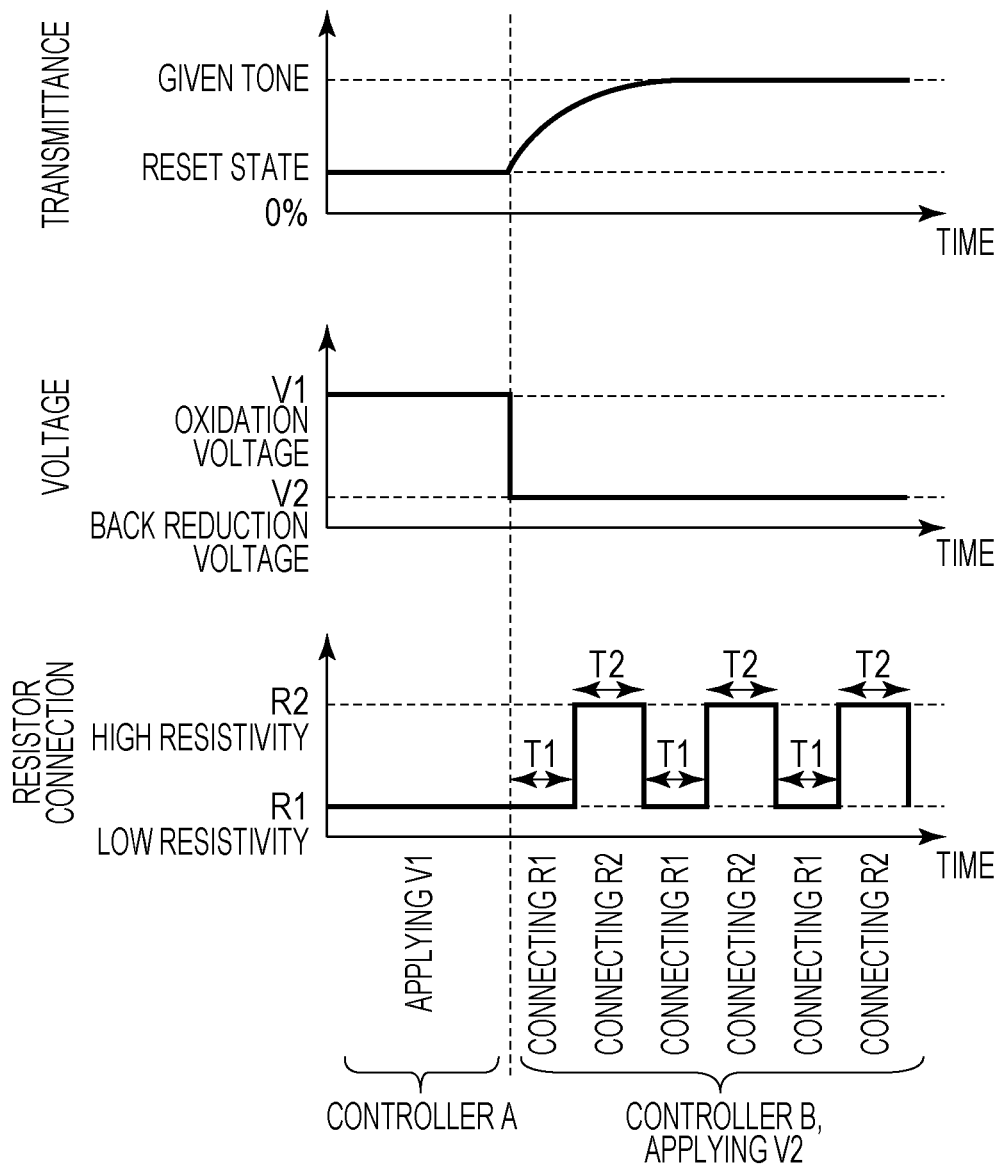
FIG. 7 is a diagram that illustrates a form of drive control used in Example 2 of the invention.

FIG. 7 illustrates voltages V1 and V2 that are applied to an EC element, resistors R1 and R2 that are connected to a closed circuit that includes the EC element, durations T1 and T2 for which the resistors R1 and R2 are connected, and an associated change in transmittance.

The following mentions a case in which an EC element is driven that contains a mixture of compounds 1 to 4 used in FIGS. 4A and 4B. Compounds 1 to 4 are colored upon application of the oxidation voltage and turn colorless upon application of the back reduction voltage. The initial state (reset state) is the colored state, the oxidation voltage is V1, and the back reduction voltage is V2. What resets the EC element to the initial state is controller A, and what sets it at the next tone following controller A is controller B.

Controller B continuously repeats connecting the resistor R1 to the closed circuit that includes the element for the duration T1 with the back reduction voltage V2 applied and connecting the resistor R2 for the duration T2.

The resistor R1 is of low resistivity, and connecting R1 makes back reduction more likely to occur by allowing current to flow in the closed circuit. The resistor R2 is of high resistivity, and connecting R2 makes back reduction less likely to occur by preventing current from flowing in the closed circuit.

In general, it is known that in an EC element in which a dissolved organic material is used as an EC material, the cation resulting from oxidation returns to the neutral state because of self-erasing when left in an open-circuit state (equivalent to a closed circuit when connected with the air, a high-resistivity material). Making V2 more negative therefore back-reduces most of the EC material, resetting it to the neutral state. In electrochemical measurement, however, a region is present between oxidation and back reduction where both reactions are simultaneously initiated, extending over a voltage range of 60 mV to several hundred millivolts. The use of a voltage at which back reduction is slightly dominant to oxidation as back reduction voltage allows for tone control with a smaller amount of the material back-reduced.

The change in transmittance is therefore controlled through the control of the ratio of the duration T1 with the total duration (T1+T2) constant, where T1 is the duration for which back reduction proceeds and T2 is the duration for which back reduction stops. Increasing the ratio of the duration T1 increases the change in transmittance, and reducing the ratio of the duration T1 reduces the change in transmittance.

Tone control during which the shape of the absorption spectrum is maintained can be done by first resetting the element to the initial state with controller A and then controlling the tone with controller B.

Example 3

This example describes the control of transmittance by taking a material whose neutral species turns into anion developing a color upon reduction as an illustrative organic EC material, assuming that the initial state of an EC element (the state of the element after resetting) is a state in which the transmittance of the EC element is large as a result of erasing.

Figure 8:
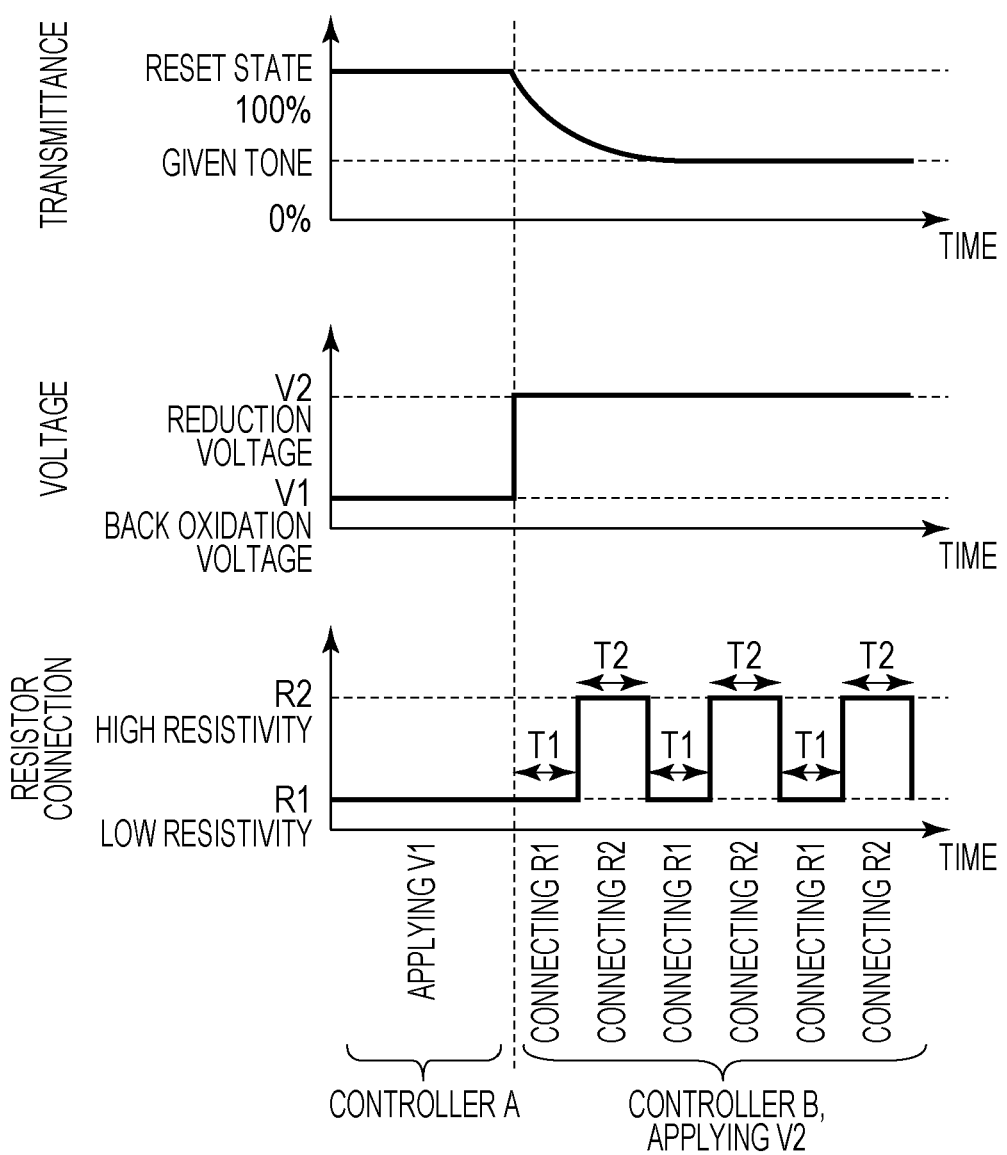
FIG. 8 is a diagram that illustrates a form of drive control used in Example 3 of the invention.

FIG. 8 illustrates voltages V1 and V2 that are applied to an EC element, resistors R1 and R2 that are connected to a closed circuit that includes the EC element, durations T1 and T2 for which the resistors R1 and R2 are connected, and an associated change in transmittance.

Examples of EC materials that form anion include anthraquinone dyes.

Anthraquinone is colored upon application of the reduction voltage and turns colorless upon application of the back oxidation voltage. The initial state (reset state) is the colorless state, the back oxidation voltage is V1, and the reduction voltage is V2. What resets the EC element to the initial state is controller A, and what sets it at the next tone following controller A is controller B.

Controller B continuously repeats connecting the resistor R1 to the closed circuit that includes the element for the duration T1 with the reduction voltage V2 applied and connecting the resistor R2 for the duration T2.

The resistor R1 is of low resistivity, and connecting R1 makes reduction more likely to occur by allowing current to flow in the closed circuit. The resistor R2 is of high resistivity, and connecting R2 makes reduction less likely to occur by preventing current from flowing in the closed circuit.

In general, it is known that in an EC element in which a dissolved organic material is used as an EC material, the anion resulting from reduction returns to the neutral state because of self-erasing when left in an open-circuit state (equivalent to a closed circuit when connected with the air, a high-resistivity material).

The change in transmittance is therefore controlled through the control of the ratio of the duration T1 with the total duration (T1+T2) constant, where T1 is the duration for which reduction proceeds and T2 is the duration for which reduction stops. Increasing the ratio of the duration T1 increases the change in transmittance, and reducing the ratio of the duration T1 reduces the change in transmittance.

Tone control during which the shape of the absorption spectrum is maintained can be done by first resetting the element to the initial state with controller A and then controlling the tone with controller B.

A driver according to an aspect of the invention for an electrochromic element, which allows the element to display a desired tone and maintain the tone causing no change in the shape of the absorption spectrum, can be used in optical filters, in particular, a neutral density (ND) filter for cameras.

Certain aspects of the invention provide a driver for an electrochromic element that allows the element to display a desired tone causing no changes in the shape of the absorption spectrum, a method for driving an electrochromic element with such a driver, an optical filter, an imaging device, a lens unit, and a window component.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-120805, filed Jun. 7, 2013, and Japanese Patent Application No. 2014-099901, filed May 13, 2014, which are hereby incorporated by reference herein in their entirety.

What is claimed is:

1. A driver for an electrochromic element, the driver configured to adjust transmittance of the electrochromic element, the electrochromic element having a pair of electrodes and an electrochromic layer, which includes at least one organic electrochromic material and which is positioned between the electrodes, the driver comprising:
   an adjusting controller, wherein:
   the adjusting controller, after applying a voltage V1, applies a voltage V2, the voltage V2 being higher than the voltage V1 and not lower than an oxidation voltage if the voltage V1 is equal to or lower than a back reduction voltage, or the voltage V2 being lower than the voltage V1 and not higher than the back reduction voltage if the voltage V1 is equal to or higher than the oxidation voltage, and
   the adjusting controller is configured to adjust the transmittance of the electrochromic element with use of a pulse width of the voltage V2,
   wherein the voltage V1 is equal to or higher than the oxidation voltage, and
   wherein the adjusting controller adjusts the pulse width of the voltage V2 by controlling a ratio of a duration T1 to a total duration T1+T2 the duration T1being the duration for which back reduction of the organic electrochromic material proceeds and the duration T2 being the duration for which the back reduction stops.

2. The driver for an electrochromic element according to claim 1, wherein:
   the adjusting controller is configured to saturate a change in the transmittance of the electrochromic element by applying the voltage V1.

3. The driver for an electrochromic element according to claim 1, wherein the adjusting controller is configured to adjust the transmittance of the electrochromic element by changing T1 with a total duration T1+T2 constant.

4. The driver for an electrochromic element according to claim 3, wherein the duration T1+T2 is 100 milliseconds or less.

5. The driver for an electrochromic element according to claim 1, wherein the electrochromic layer includes a plurality of organic electrochromic materials, and the voltage V1 and V2 are voltages equal to or higher than a highest oxidation voltage of or equal to or lower than a lowest back reduction voltage of oxidation and back reduction voltages of each of the plurality of organic electrochromic materials.

6. The driver for an electrochromic element according to claim 5, wherein at least one of the plurality of organic electrochromic materials has an optical absorption peak different from an optical absorption peak of the other organic electrochromic materials.

7. The driver for an electrochromic element according to claim 5, wherein at least one of the plurality of organic electrochromic materials has an optical absorption peak in a wavelength range from 440 nm to 490 nm or a wavelength range from 540 nm to 630 nm.

8. An optical filter comprising an electrochromic element and the driver for an electrochromic element according to claim 1.

9. An imaging device comprising the optical filter according to claim 8 and a light-receiving element configured to receive light after the light has passed the optical filter.

10. The driver for an electrochromic element according to claim 1, wherein:
the electrochromic element is a solution-type electrochromic element.

11. The driver for an electrochromic element according to claim 1, wherein the adjusting controller connects a resistor R1 and the electrochromic element for a duration T1 and connects a resistor R2 of higher resistivity than the resistor R1 and the electrochromic element for a duration T2; and
the adjusting controller continuously alternates connecting the resistor R1 for the duration T1 and connecting the resistor R2 for the duration T2 while in operation for controlling the pulse width of the voltage V2.

12. A driver for an electrochromic element, the driver configured to adjust transmittance of the electrochromic element, the electrochromic element having a pair of electrodes and an electrochromic layer, which includes at least one organic electrochromic material and which is positioned between the electrodes, the driver comprising:
an adjusting controller, wherein:
the adjusting controller, after applying a voltage V1,
applies voltage V2, the voltage V2 being higher than the voltage V1 and not lower than a reduction voltage if the voltage V1 is equal to or lower than a back oxidation voltage, or the voltage V2 being lower than the voltage V1 and not higher than the back oxidation voltage if the voltage V1 is equal to or higher than the reduction voltage, and
the adjusting controller is configured to adjust the transmittance of the electrochromic element with use of a pulse width of the voltage V2,
wherein the voltage V1 is equal to or higher than the reduction voltage, and
wherein the adjusting controller adjusts the pulse width of the voltage V2 by controlling a ratio of a duration T1 to a total duration (T1 +T2) the duration T1 being the duration for which back oxidation of the organic electrochromic material proceeds and the duration T2 being the duration for which the back oxidation stops.

13. The driver for an electrochromic element according to claim 12, wherein:
the adjusting controller is configured to saturate a change in the transmittance of the electrochromic element by applying the voltage V1.

14. An optical filter comprising an electrochromic element and the driver for an electrochromic element according to claim 12.

15. An imaging device comprising the optical filter according to claim 14 and a light-receiving element configured to receive light after the light has passed the optical filter.

16. The driver for an electrochromic element according to claim 12, wherein the adjusting controller connects a resistor R1 and the electrochromic element for a duration T1 and connects a resistor R2 of higher resistivity than the resistor R1 and the electrochromic element for a duration T2; and
the adjusting controller continuously alternates connecting the resistor R1 for the duration T1 and connecting the resistor R2 for the duration T2 while in operation for controlling the pulse width of the voltage V2.

17. A method for driving an electrochromic element, the method designed to adjust transmittance of the electrochromic element, the electrochromic element having a pair of electrodes and an electrochromic layer, which includes at least one organic electrochromic material and which is positioned between the electrodes, the method comprising:
adjusting the transmittance of the electrochromic element, the adjustment including applying a voltage V1 to the electrochromic element and then controlling the transmittance, wherein the control, following the application of the voltage V1, includes:
applying a voltage V2, the voltage V2 being higher than the voltage V1 and not lower than an oxidation voltage if the voltage V1 is equal to or lower than a back reduction voltage, or the voltage V2 being lower than the voltage V1 and not higher than the back reduction voltage if the voltage V1 is equal to or higher than the oxidation voltage, and adjusting a pulse width of the voltage V2,
wherein the adjusting the transmittance of the electrochromic element includes controlling a ratio of a duration T1 to a total duration (T1 +T2), the duration T1 being the duration for coloring, and the duration T2 being the duration for erasing.

18. The method for driving an electrochromic element according to claim 17, wherein:
the application includes saturating a change in the transmittance of the electrochromic element to reset the electrochromic element to an initial state by applying the voltage V1.

* * * * *